United States Patent

[11] 3,622,500

[72] Inventors Seymour B. Alpert
Princeton;
Michael C. Chervenak, Pennington; Ronald H. Wolk, Lawrence Township, Mercer County, all of N.J.
[21] Appl. No. 30,431
[22] Filed Apr. 21, 1970
[45] Patented Nov. 23, 1971
[73] Assignee Hydrocarbon Research, Inc.
New York, N.Y.

[54] HYDROGENATION OF HYDROCARBONS WITH CATALYTIC MICROSPHERES
5 Claims, 1 Drawing Fig.
[52] U.S. Cl. .................................................. 208/111, 208/110, 208/112, 208/216, 208/217
[51] Int. Cl. ............................................ C10g 13/02, C10g 13/18
[50] Field of Search .......................................... 208/112, 110, 111

[56] References Cited
UNITED STATES PATENTS
3,183,180  5/1965  Schuman et al. ............. 208/110
3,235,508  2/1966  Mills ............................ 208/112
3,412,010  11/1968  Alpert et al. ................. 208/112
3,477,944  11/1969  Van Driesen ................ 208/112

*Primary Examiner*—Curtis R. Davis
*Attorneys*—Nathaniel Ely and Bruce E. Hosmer ABSTRACT: Hydrocarbon fractions boiling below 975° F. are obtained by hydrocracking heavy hydrocarbon oils, containing 40–100 percent by volume of hydrocarbon fractions boiling above 975° F., in the liquid state in the presence of ebullated catalytic macroporous microspheres. These microspheres are smaller than 60 mesh (U.S. Standard) and larger than 325 mesh. They have a pore volume of at least 0.10 cc./g. in pores larger than 250 Angstroms (A) and at least 0.30 cc./g. in pores less than 250 A. The macroporous, microspheres have an average size such that 80 weight percent fall within a narrow size range and are ebullated by the upward flow of oil and hydrogen through the reactor during hydroconversion. The pore volume of the microspheres is critical as there must be a penetration of the hydrocarbon oil into the catalyst for at least a 3 percent gain in weight.

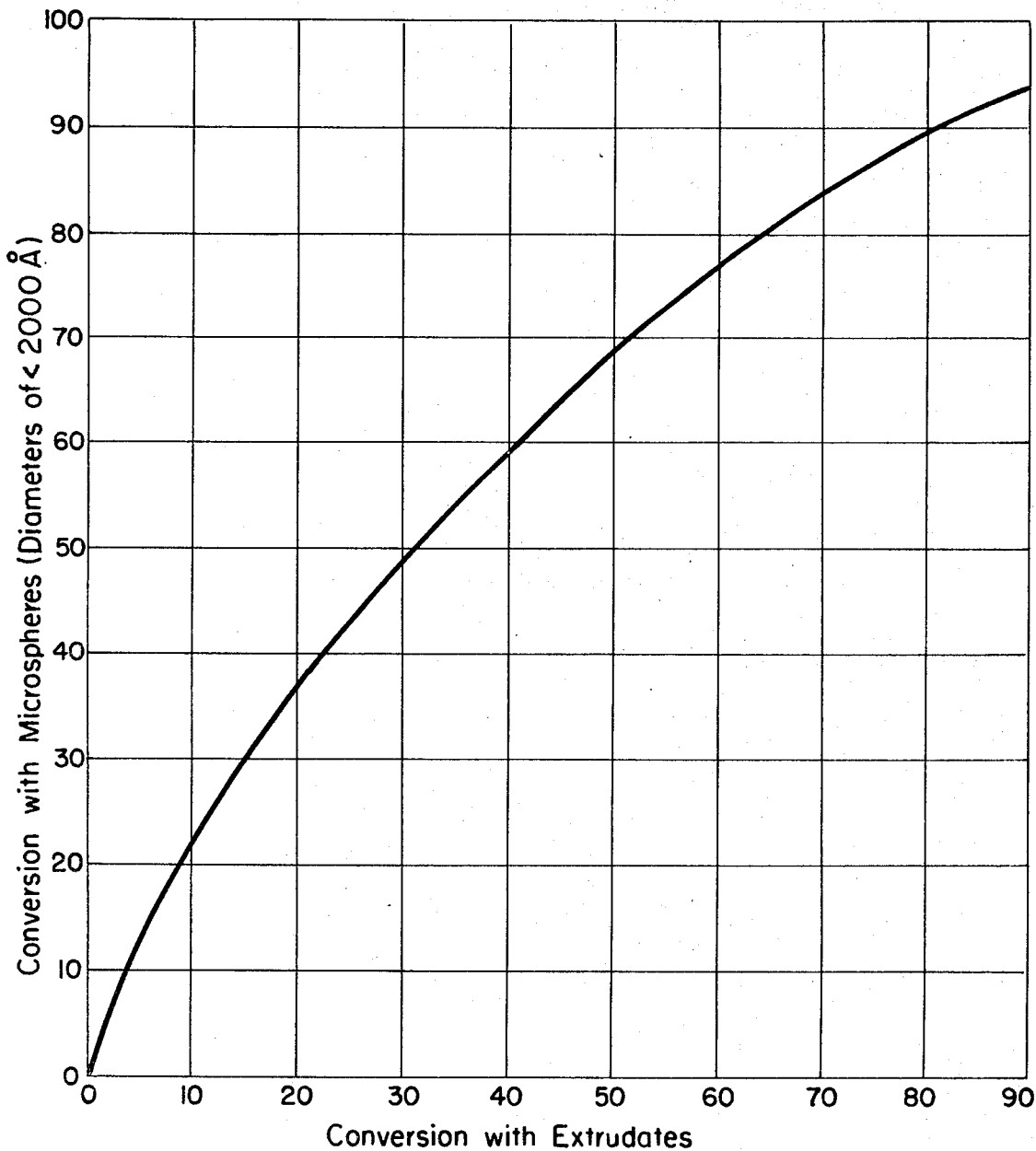

HYDROGENATION OF HYDROCARBONS WITH CATALYTIC MICROSPHERES

BACKGROUND OF THE INVENTION

This invention relates to the hydroconversion of heavy hydrocarbon oils, and more particularly to such treatment of oils so as to effect hydrocracking and hydrodesulfurization in the presence of ebullated catalyst particles.

Hydroconversion is the conversion of heavy hydrocarbon oils containing significant amounts of the extremely high molecular weight compounds to the more valuable hydrocarbon fractions which boil below 975° F. Hydroconversion of hydrocarbon oils is disclosed and claimed with the aid of ebullated catalyst particles in U.S. Pat. No. Re. 25,770. While this patent used catalyst particles larger than 60 mesh size (Tyler Mesh), U.S. Pat. No. 3,183,180 teaches the hydroconversion of hydrocarbon oils in the presence of ebullated catalysts having particle sizes in the range extending to 325 mesh (Tyler Mesh).

The advantage of using a catalyst having a small particle size is that as the catalyst particles decrease in size, the available external catalyst surface area increases. This increase in external catalyst surface area improves the conversion of reactants in the reaction zone. At the same time that the catalyst size is decreased, consideration must be given to the catalyst pore volume and pore size in view of the molecules involved in the reaction. Increasing the catalyst surface area by decreasing the catalyst particle size in order to obtain improved conversions will not be enough where the molecules in the reaction are of high molecular weight and the pore size is small. The high molecular weight molecules block the small pores of the catalyst and this results in a decrease in conversion due to the lost catalyst surface area.

There are certain heavy hydrocarbon oil feedstocks which can be characterized by the presence of a small amount, on the order of 1 percent or more, of very high molecular weight compounds. Vacuum residua containing at least 1 percent of such high molecular weight compounds would be obtained from the Kuwait, Khafji, certain Mid-Continent, and Venezuelan oil feeds. These high molecular weight compounds are very large in comparison to most of the pores in the catalyst and under reaction conditions the catalyst pores become blocked. If, for example, one should operate with an extruded catalyst as taught by Re. 25,770, the catalyst will become surface pore blocked after some limited useage even when the catalyst contains many macropores. This is a result of the openings to the macropores existing only at the surface of the extrudate. Reducing the size of a given extrudate will not prove sufficient for successful operation of the residuum conversion process unless the finely divided extrudate catalyst also has many macropores. It is the right combination of a finely divided, closely sized catalyst particle having an adequate number of macropores which is necessary for the optimum ebullated bed hydroconversion operation of residuum feeds containing some amount of large molecular weight compounds. Macroporous microspheres allow operation at conditions that are more severe than those at which microporous and macroporous extrudates can be used. The advantage to be found in such macroporous microsphere operation is a marked increase in conversion of the feed.

SUMMARY OF THE INVENTION

In accordance with this invention, an improved process for the hydroconversion of heavy hydrocarbon oils is carried out in the presence of an ebullated bed of catalyst particles in the form of macroporous microspheres of a size smaller than 60 mesh and larger than 325 mesh (U. S. Standard).

The catalytic macroporous microspheres are composed of the metals, oxides, sulfides or salts generally recognized to have activity for hydrogenating oils. Suitable metals such as platinum or palladium, and the oxides and sulfides of molybdenum, nickel and cobalt are frequently used in the hydrocracking of oils. The catalytic components are commonly supported on carriers such as alumina, silica and mixtures thereof. Additionally, the catalytic composition may include a small amount of an adjuvant such as a fluoride or a chloride.

To facilitate the maintenance of a well ebullated bed of catalytic macroporous microspheres, it is highly desirable to use macroporous microspheres that differ only slightly in average size. It has been found that best results are obtained when at least about 80 percent by weight of the catalytic macroporous microspheres fall within a narrow size range, such as 60 to 100 mesh, (U. S. Standard), 100 to 200 mesh or 140 to 325 mesh.

Both for good ebullation of the catalytic macroporous microspheres and for satisfactory residence time of the heavy oil in the reaction zone, the feedstock is passed upwardly through the reaction zone at a space velocity (volume of oil per hour per volume of reaction zone) in the range of about 0.2 to 3.0 and preferably in the range of about 0.4 to about 1.5. Simultaneously, hydrogen is passed upwardly through the reaction zone at a higher velocity than that of the feedstock, the flows of liquid and gas being controlled so that the oil velocity does not exceed 0.4 of the gas velocity. Preferably, the liquid velocity will be in the range of about 0.04 to about 0.15 of the gas velocity.

Fresh feed hydrogen is at least about 90 percent by volume pure and preferably is over about 95 percent by volume pure. The diluents of the fresh feed hydrogen are usually carbon oxides, nitrogen, argon, methane and $H_2O$. To achieve desirable rates of hydrogenation of heavy hydrocarbon oils pursuant to this invention, the pressure in the reaction zone is maintained in the range of about 1,000 to about 5,000 p.s.i.g. (pounds per square inch gauge). Generally, it is preferred to carry out the hydroconversion of heavy oils at a pressure in the range of about 1,500 to about 3,000 p.s.i.g.

The hydroconversion of heavy oils is generally conducted at a temperature in the range of about 750° to about 900° F. In most cases, a temperature in the range of about 800° to about 850° F. is preferred.

The advantages of this invention are that heavy oils with over 40 percent by volume and as much as 100 percent by volume thereof boiling above a temperature of 975° F. can be converted to at least 50 percent by volume boiling below 975° F. to more valuable lower boiling hydrocarbons, while maintaining the activity of the catalytic macroporous microspheres over a longer period of operation than has previously been found possible heretofore with microporous microspheres or either extruded micro- or macroporous catalysts. Even with feedstocks that contain 100 percent by volume hydrocarbons boiling above 975° F., conversions of about 70 to about 90 percent by volume to lower boiling hydrocarbons are frequently attained.

Accordingly, the principal object of this invention is to provide an improved process for the hydroconversion of hydrocarbon oils in the presence of an ebullated bed of microspherical catalyst particles which do not have the limitations and disadvantages of extruded catalysts.

Another object of this invention is to provide an improved process for the hydroconversion of heavy hydrocarbon oils containing at least 1 percent of very high molecular weight compounds in the fraction boiling above 975° F., wherein the hydrocarbons can be hydrocracked to convert at least 50 percent by volume of the fraction boiling above 975° F. to more valuable lower boiling hydrocarbons.

Yet another object of this invention is to provide an improved process for the hydroconversion of heavy hydrocarbon oils in the presence of catalyst microspheres.

A further object of this invention is to provide an improved process for the hydroconversion of heavy hydrocarbon oils using an ebullated bed of macroporous catalyst microspheres.

Further objects of this invention will become apparent from the detailed description of the preferred embodiment of this invention following herein.

DESCRIPTION OF DRAWING

The FIGURE is a graph showing the effects of using macroporous microspheres versus extrudates in hydroconversions.

DESCRIPTION OF PREFERRED EMBODIMENTS

The advantages of the process of this invention are particularly unexpected when using feedstocks of the type that ordinarily deactivate the catalyst at a relatively high rate. Some exploratory studies using gel permeation chromatography indicate that such feedstocks contain at least 1 percent by weight of hydrocarbons of large molecular size, exceeding 1,000 Angstroms. A feedstock with an API gravity of 10.50 and with only about 1 percent by weight of hydrocarbons with molecular sizes ranging from 10,000 to 20,000 Angstroms cannot practically be converted in the presence of an ebullated bed of microporous microspheres or extruded catalyst to effect even a minimum conversion of 50 percent by volume of the hydrocarbons boiling over 975° F. to lower boiling hydrocarbons without fouling the catalyst particles at such a rapid rate that in a short period, on the order of a few days, the catalyst is essentially deactivated. Yet the same feedstock when hydroconverted in the presence of an ebullated bed of catalytic macroporous microspheres is converted to the extent that at least 50 percent by volume of hydrocarbons originally boiling above 975° F. is recovered as valuable lower boiling hydrocarbons while the catalytic macroporous microspheres maintain an economically acceptable active life.

The advantages of the process are particularly applicable to feedstocks containing small amounts of high molecular weight compounds. Conventional inspections and gel permeation chromatographs were performed in two feeds (A and B) with the following results:

TABLE I

| Feed | A | B |
|---|---|---|
| Gravity, °API | 10.5 | 5.8 |
| Sulfur, wt. % | 1.36 | 4.02 |
| Viscosity, Saybolt Furrol at 210° F./sec. | 808 | 2,039 |
| Ramsbottom Carbon, wt. % | 18.8 | 21.4 |
| Pentane Insolubles, wt. % | 17.1 | 20.7 |
| Percent Boiling Below 975° F. | 1.7 | 3.9 |
| Average Molecular Weight | 1,000 | 1,033 |

GEL PERMEATION CHROMATOGRAPHIC ANALYSES

| Cumulative Percent of Material | A | B | Size in [Angstroms] |
|---|---|---|---|
| 0 | 10 | 15 | |
| 10 | 23 | 27 | |
| 20 | 37 | 38 | |
| 30 | 50 | 47 | |
| 40 | 62 | 56 | |
| 50 | 74 | 66 | |
| 60 | 86 | 79 | |
| 70 | 109 | 97 | |
| 80 | 160 | 125 | |
| 90 | 600 | 170 | |
| 100 | 20,000 | 1,000 | |

As may be seen, the gel permeation chromatograph reveals 10–20 percent of the A feed as high molecular weight compounds which would tend to block small size pores in regularly used catalysts.

The drawing compares the conversion of the fractions boiling above 975° F. to fractions boiling below 975° F. when using a macroporous microsphere catalyst and when using an extrudate catalyst. The curve shows that when operating the microsphere or the extrudate systems at the same operating conditions, a conversion, such as 33 percent using an extruded catalyst would result in an improved conversion under those same conditions to 50 percent by using a macroporous microspheres catalyst.

In this invention it has been discovered that the macroporous microsphere catalyst must have certain critical characteristics. One of these is a penetration number as hereinafter set forth. As the ability of the feed to penetrate a catalyst is dependent on the porosity of the catalyst it was additionally discovered that the pore structure of the microspheres was important.

A macroporous microsphere catalyst according to this invention should be of a type and fall within a given size range as hereinbefore described. At the same time the macroporous microspheres have a pore volume of from about 0.10 to 0.60 cc./g. comprising pores larger than 250 A and a pore volume of from about 0.30 to 0.50 cc./g. comprising pores with a diameter of less than 250 A. The total pore volume of the macroporous microspheres is between about 0.40 and about 1.10 cc./g. A preferred macroporous microsphere catalyst would have a pore volume of from about 0.2 to about 0.4 cc./g. in pores with a diameter larger than 250 A and a pore volume from about 0.35 to about 0.45 cc./g. in pores with a diameter of less than 250 A and the total pore volume is between about 0.55 and about 0.85 cc./g.

In this invention it has been discovered that previously known porosity tests are misleading and indeterminative for commercial catalysts. So-called BET numbers must be correlated with the actual conditions under which they are determined, and these, basically, comprise, singly, or in combination: (1) mercury penetration, (2) nitrogen penetration and (3) commercial solvent (e.g. benzene, toluene, isopropyl alcohol) penetration. None of these is indicative of field acceptability of a catalyst.

A new test which can be used with most commercially available porosity meters to determine catalytic life and efficiency was developed. This development was based on the realization that tests of catalysts using ultra-high surface-tension agents, ultra-low surface-tension agents, commercial solvents or the like are inadequate. This stringent test accurately rates potential catalytic efficiency and life expectancy by testing porosity with a combined deleterious agent and common diluent material.

Basically the penetration test consists of mixing about 1 to 2 grams of the catalyst microspheres with about 5 grams of an equal proportion mixture of oil and benzene in a 50 milliliter beaker for 15 minutes. The slurry is filtered in a tared Gooch crucible using benzene until the filtrate is clean appearing. The crucible and microspheres are dried in a vacuum oven at 100° C. for 1 hour. After the microspheres and crucible have cooled, they are weighed to determine the weight gain which is a direct indication of oil penetration.

Microscopic inspection or the like is used to physically measure the percent penetration which has occurred on catalyst sample. A distinct color differential exists between that portion of the catalyst which has been penetrated and that portion in which no penetration has occurred.

There is a good correlation between the penetration numbers and the efficiency, overall operability, and catalyst life in residuum hydroconversion and the like processes. This test has the distinct advantage over pervious porosity measurements in that it reflects those parameters of the catalyst which are most important under actual operating conditions. The previously known tests do not reflect catalyst parameters such as constrictions, orientation, passage size and the like.

It is desirable that the penetration number be at least 3 percent and it is preferable that it be greater than 5 percent but it is most preferred that it be greater than 10 percent for a macroporous microspherical catalyst with 100 percent penetration being ideal.

It has now been found that where an extruded catalyst in an ebullated state with a given heavy oil is limited to about 90 percent volume conversion of hydrocarbons originally boiling above 975° F. to lower boiling hydrocarbons, the conversion can be increased at least 5 (absolute) to 95 percent simply by using catalytic macroporous microspheres in place of the extruded catalyst. This type of feed material is usually free of the very high molecular size compounds. However, in cases where extruded catalysts are only capable of effecting in various heavy oils between about 30 and about 80 percent conversion of hydrocarbons originally boiling above 975° F. to lower boiling hydrocarbons, the replacement of the extruded catalyst by catalytic macroporous microspheres in each case results in a substantial increase of about 10 to about 20 percent (absolute) in the conversion of hydrocarbons originally boiling above 975° F. to lower boiling hydrocarbons. In general, the lower the conversion of a heavy oil is in using an extruded catalyst, the greater the increase in conversion is when catalytic macroporous microspheres are substituted for the extruded catalyst.

As taught in the aforesaid patents, an ebullated bed is one in which the solid particles are kept in random motion by the upward flow of liquid and gas; the ebullated bed will have a gross volume at least 10 percent greater than the volume of the solids thereof in a settled state. The bulk density of fresh catalytic macroporous microspheres used in this invention is in the range of about 25 to about 60 pounds per cubic foot. Even with macroporous microspheres of lowest bulk density, the concentration of the macroporous microspheres in a well ebullated bed is greater than 5 pounds per cubic foot while above the interface which defines the top of the ebullated bed, the concentration of the macroporous microspheres is less than 0.1 pound per cubic foot.

As previously mentioned, catalytic macroporous microspheres exhibit a comparatively long active life. Generally, replacement of the catalytic macroporous microspheres in an ebullated hydrocracking zone takes place at a rate in the range of about 0.05 to about 0.25 pound per barrel (42 U.S. gallons) of feedstock. The desired low rates of withdrawal and of replacement of catalytic macroporous microspheres are simply effected. At such low rates, fouled macroporous microspheres are withdrawn from the hydroconvertor together with converted liquid hydrocarbons while fresh macroporous microspheres are introduced at the same rate by suspension in the feedstock being fed into the hydroconversion reaction zone.

The patents also teach the desirability of recycling hydrogen as well as liquid hydrocarbons through the reactor which is of simple construction, usually a cylindrical vessel with a height that is several times the diameter. While the recycling of hydrogen is advantageous in the operation of the process of this invention, the recycling of liquid hydrocarbons is only occasionally necessary and in such case, the rate of recycled liquid hydrocarbons rarely exceeds one volume of recycled liquid per volume of feedstock supplied to the hydrocracker.

Having thus described the invention in general terms, reference is now made to the specific examples which have been carried out in accordance with the techniques of the present invention which should not be construed as unduly limiting thereof.

EXAMPLE 1

A feedstock composed of equal volumes of the residuum of a vacuum distilled crude oil and of the distillation residuum of a deasphalted oil consisted entirely of hydrocarbons boiling above 975° F. Catalytic macroporous microspheres entirely in the size range of 70 to 325 mesh with 84 percent by weight thereof being in the size range of 100 to 270 mesh were compared with an extruded catalyst of the same composition, the extruded catalyst being in the form of tiny cylinders having a diameter of one thirty-second inch. Using each form of the catalyst which contained 12.8 percent by weight of molybdenum oxide and 3.2 percent by weight of cobalt oxide, the feedstock was hydrocracked in the presence of an ebullated bed of that catalyst under comparable conditions and with the results shown in table II.

Herein follows the porosity of the catalysts used:

| Porosity | Macroporous Microspheres | Extrudates |
|---|---|---|
| Less than 250 A | 0.35 cc./g. | 0.4 cc./g. |
| Greater than 250 A | 0.30 cc./g. | 0.15 cc./g. |

TABLE II

| Operating Conditions | Catalyst Microspheres | Extruded Catalyst |
|---|---|---|
| Hydrogen Pressure, p.s.i.g. | 2,300 | 2,200 |
| Reaction Temperature, °F. | 835 | 837 |
| Oil Space Velocity | 0.46 | 1.00 |
| Hydrogen Rate, SCF/Bbl* | 6,300 | 6,000 |
| Yields Based on Feedstock | | |
| $H_2S$, $NH_3$, $C_1$–$C_3$, % by weight | 8.3 | 6.3 |
| $C_4$–360° F. % by volume | 16.5 | 9.5 |
| 360°–650° F. % by volume | 28.8 | 19.3 |
| 650°–975° F. % by volume | 35.9 | 31.8 |
| over 975° F. % by volume | 24.2 | 43.8 |
| Total $C_4$ and over, % by volume | 105.4 | 104.4 |
| Successful conversion, % by volume | 75.8 | |
| Failed at indicated conversion % | | 56.2 |

*SCF/Bbl is standard cubic feet (measured at atmospheric pressure and 60° F.) per barrel of feedstock.

The catalytic macroporous microspheres not only gave a conversion that was 19.6 percent (absolute) higher than that obtained with the extruded catalyst, but also produced a higher proportion of highly desirable liquid hydrocarbons boiling below 650° F.

EXAMPLE 2

A Canadian residuum of 10° API gravity boiling entirely above 975° F. and containing 4 percent by weight of sulfur was hydrocracked with each of the catalysts of example 1 in an ebullated state. Table III presents the comparable operating conditions and the results obtained.

TABLE III

| Operating Conditions | Catalytic Microspheres | Extruded Catalyst |
|---|---|---|
| Hydrogen Pressure, p.s.i.g. | 2,240 | 2,240 |
| Reaction Temperature, °F. | 833 | 825 |
| Oil Space Velocity | 0.6 | 0.6 |
| Hydrogen Rate, SCF/Bbl | 5,400 | 6,500 |
| Yields Based on Feedstock | | |
| $H_2S$, $NH_3$, $C_1$–$C_3$, % by weight | 8.9 | 7.4 |
| $C_4$–360° F., % by volume | 24.3 | 16.3 |
| 360°–650° F. % by volume | 34.0 | 30.1 |
| 650°–975° F. % by volume | 37.9 | 45.1 |
| over 975° F. % by volume | 9.1 | 15.0 |
| Total $C_4$ and over, % by volume | 105.3 | 106.5 |
| Successful conversion, % by volume | 90.9 | |
| Failed at indicated conversion % | | 85.0 |

EXAMPLE 3

The residuum of a Middle East crude oil known to have a high propensity to deposit carbon on hydrogenation catalysts was hydrocracked with the catalysts of example 1 in an ebullated state. Table IV gives the operating conditions and the results obtained with this feedstock having only 40 percent by volume thereof boiling above 975° F., and API gravity of 9° and a sulfur content of 5 percent by weight.

TABLE IV

| Operating Conditions | Catalytic Microspheres | Extruded Catalyst |
| --- | --- | --- |
| Hydrogen Pressure, p.s.i.g. | 2,100 | 2,000 |
| Reaction Temperature, °F. | 809 | 809 |
| Oil Space Velocity | 0.84 | 1.00 |
| Hydrogen Rate, SCF/Bbl | 3,500 | 4,300 |
| Yields Based on Feedstock | | |
| $H_2S$, $NH_3$, $C_1$-$C_3$ % by weight | 5.8 | 6.9 |
| $C_4$-360° F. % by volume | 7.6 | 9.1 |
| 360°-650° F. % by volume | 26.2 | 22.6 |
| 650°-975° F. % by volume | 49.9 | 45.1 |
| over 975° F. % by volume | 20.0 | 27.0 |
| Total $C_4$ and over, % by volume | 103.7 | 103.8 |
| Successful conversion, % by volume | 50.0 | |
| Failed at indicated conversion % | | 32.5 |

EXAMPLE 4

Comparative tests were run on Kuwait Vacuum Residuum (7°API, 5.5 W %S) on two different types of microspheres, only one of which had the proper macroporosity as set forth hereinbefore. The operating conditions and the yields are summarized below. It should be noted that the maximum conversion on the macroporous catalyst was at least 86.5 percent. The nonmacroporous catalyst failed at 77.6 percent.

| | Macroporous Microspheres | Non-Macroporous Microspheres |
| --- | --- | --- |
| Pore Volume in pores > 250 A cc./g. | 0.13 | 0.07 |
| Operating Conditions | | |
| Hydrogen Pressure, p.s.i.g. | 2,000 | 2,000 |
| Reaction Temperature, °F. | 833 | 832 |
| Oil Space Velocity | 0.49 | 0.75 |
| Hydrogen Rate, SCF/Bbl | 6,000 | 4,000 |
| $C_1$-$C_3$, $H_2S$, $NH_3$ Wt. % | 8.5 | 9.1 |
| $C_4$-400° F. % by volume | 28.5 | 21.3 |
| 400°-680° F. % by volume | 35.9 | 32.6 |
| 680°-975° F. % by volume | 29.6 | 30.5 |
| over 975° F. % by volume | 13.5 | 22.4 |
| Total $C_4$ and over % by volume | 107.5 | 106.8 |
| Successful conversion, % by volume | 86.5 | |
| Failed at indicated conversion % | | 77.6 |

Those skilled in the art will visualize many modifications and variations of this invention without departing from its spirit and scope. Accordingly, the claims should not be interpreted in any restrictive sense other than that imposed by the limitations recited within the claims.

We claim:

1. In a process for the hydroconversion of a hydrocarbon feed containing at least 40 percent by volume of components boiling above 975° F. wherein the feed and a hydrogen-rich gas pass upwardly through a reaction zone containing a bed of particulate catalyst selected from the group consisting of platinum, palladium, molybdenum, nickel, cobalt, oxides and sulfides thereof and mixtures thereof supported on a carrier selected from the group consisting of alumina, silica and mixtures thereof; while said reaction zone is maintained at a temperature between 750° and 900° F. and at a pressure between 1,000 and 5,000 p.s.i.g. with a combined fluid velocity sufficient to expand the bed of catalyst so as to maintain the catalyst in random motion in the liquid without substantial carryover of the catalyst from said reaction zone the improvement which comprises:

a. using a particulate macroporous catalyst having a total pore volume between 0.4 and 1.1 cc./g.;
 1. said catalyst having a pore volume between 0.1 and 0.6 cc./g. in pores with diameters greater than 250 A and;
 2. having the remainder of the pore volume comprised of between 0.3 and 0.5 cc./g. in pores with diameters less than 250 A and;
 3. the oil penetration number being at least 3 percent;

b. and maintaining a space velocity such that at least 50 percent of said components boiling above 975° F. are converted to components boiling below 975° F.

2. The process of claim 1 wherein the particulate catalyst is substantially spherical having a size such that 80 percent of said catalyst falls within a narrow size range between 60 and 325 Tyler mesh.

3. The process of claim 1 wherein the oil penetration number is at least 30 percent.

4. The process of claim 1 wherein the improvement comprises using a macroporous microsphere catalyst:

a. said catalyst having a pore volume between about 0.2 and 0.4 cc./g. in pores with diameters greater than 250 A and;
b. having a pore volume of between about 0.35 and about 0.45 cc./g. in pores with diameters less than 250 A and;
c. having a total catalyst pore volume between about 0.55 and about 0.85 cc./g. and;
d. having an oil penetration number of at least 10 percent.

5. The process of claim 4 wherein said catalyst is cobalt-molybdate on alumina.

* * * * *